United States Patent [19]
Mochizuki et al.

[11] Patent Number: 5,777,335
[45] Date of Patent: Jul. 7, 1998

[54] IMAGING APPARATUS

[75] Inventors: Chiori Mochizuki, Zama; Akira Funakoshi, Atsugi; Akira Tago, Utsunomiya; Shinichi Takeda, Atsugi; Eiichi Takami, Chigasaki; Masakazu Morishita, Hiratsuka; Shinichi Hayashi, Ebina; Tadao Endo, Atsugi; Toshikazu Tamura, Utsunomiya, all of Japan

[73] Assignee: Canon Kabushiki Kaisha, Tokyo, Japan

[21] Appl. No.: 721,947

[22] Filed: Sep. 27, 1996

[30] Foreign Application Priority Data

Sep. 28, 1995 [JP] Japan .................... 7-250510
Sep. 12, 1996 [JP] Japan .................... 8-241562

[51] Int. Cl.[6] .................... G01T 1/29
[52] U.S. Cl. .................... 250/370.09; 250/370.11
[58] Field of Search .................... 250/370.09, 370.11, 250/336.1, 374

[56] References Cited

U.S. PATENT DOCUMENTS 5,043,582   8/1991   Cox et al. .................... 250/370.09
5,500,534   3/1996   Robinson et al. .................... 250/385.1

*Primary Examiner*—Michael J. Tokar
*Assistant Examiner*—Richard Hanig
*Attorney, Agent, or Firm*—Fitzpatrick, Cella, Harper & Scinto

[57] ABSTRACT

An imaging apparatus whose substrate or base stand is arranged to be a member to absorb or shield radiation in order to prevent semiconductor element, such as ICs, provided for driving photoelectric elements from making any malfunction or from being deteriorated by the irradiation of radiation, such as X-rays or γ-rays, transmitted from the photoelectric conversion element substrate or base stand or in order to prevent radiation from being scattered.

41 Claims, 9 Drawing Sheets

IMAGING APPARATUS

BACKGROUND OF THE INVENTION

1. Field of the invention

The present invention relates to an imaging apparatus. More particularly, the invention relates to an imaging apparatus capable of converting radiation including X-rays, γ-rays, or the like to a light having a highly sensitive or practically sensitive wavelength region, such as a visible light, and of receiving such converted light for its conversion into electric signals.

2. Related Background Art

An imaging apparatus that reads radiation including X-rays, γ-rays, or the like that carries information such as image information is generally formed by the combination of photoelectric conversion elements and the phosphor that is an element to convert wavelength. In other words, radiation is irradiated upon a wavelength converter such as phosphor to convert it to the one having a wavelength that can be sensed by the photoelectric conversion elements, thus reading information after having converted it into electric signals.

A photoelectric conversion element is selected appropriately in accordance with the wavelength to be converted by a wavelength converter. However, it is known that non-monocrystalline semiconductor material such as non-monocrystalline silicon, amorphous silicon (a-Si) in particular, is used as a photoelectric conversion semiconductor material, because by use of such material, it is not only easy to arrange the photoelectric conversion elements in an array or a matrix, but also, to obtain them in an elongated form or a form having a large area.

Besides being usable as a photoelectric conversion material, the non-monocrystalline semiconductor material can be used also as a semiconductor material for TFT (Thin Film Transistor).

The non-monocrystalline semiconductor material can be used to form a semiconductor layer for a photoelectric conversion element, and at the same time, to form a semiconductor layer for the TFT that constitutes a driving circuit. Therefore, it is widely used as a semiconductor material for an imaging apparatus.

Also, in addition to non-monocrystalline semiconductor materials described above, an imaging apparatus is often provided with integrated circuit elements using monocrystalline semiconductor materials that constitute a driving circuit.

In order to read out information contained in radiation, it is of course necessary to irradiate radiation. At this juncture, all the irradiated radiation should desirably be conveyed by means of a wavelength converter such as phosphor to a light having a desired wavelength such as a visible light.

In practice, however, the radiation that has not been completely converted by the wavelength converter may be irradiated directly onto the photoelectric conversion elements or the peripheral circuit in some cases.

As described above, integrated circuit elements or the like are formed on the peripheral circuit. If radiation is irradiated onto such elements, radiation is incident upon the transistors and TFT elements in them to cause malfunctions sometimes or even deteriorate the characteristics thereof in some cases.

Also, the radiation incident upon unwanted locations may sometimes cause radiation to scatter externally. With such external scattering, there occurs the generation of noises deriving from the scattered radiation.

SUMMARY OF THE INVENTION

It is an object of the present invention to provide an imaging apparatus for which problems have been solved with respect to any malfunctions and deterioration of elements due to unprepared irradiation of radiation.

It is another object of the invention to provide an imaging apparatus for which problems have been solved with respect to the scattering of radiation to the unwanted locations and the scattering of radiation outside the apparatus, and also, the generation of noises derived from such scattering.

It is still another object of the invention to provide an imaging apparatus structured to be able to implement the reduction of part numbers and step numbers in manufacturing such apparatus, thus attaining the reduction of costs and size of the apparatus, while enhancing the reliability thereof.

It is a further object to provide an imaging apparatus comprising a substrate, a sensor array arranged on the substrate with a plurality of photoelectric conversion elements to photoelectrically convert the radiation that carries information, a semiconductor circuit arranged for the photoelectric conversion elements, wherein the substrate is provided with a member to shield or absorb radiation.

It is still a further object of the invention to provide an imaging apparatus comprising a substrate, a sensor array arranged on the substrate with a plurality of photoelectric conversion elements, a base stand arranged for the sensor array, and a semiconductor circuit for the photoelectric conversion elements, wherein the base stand is provided with a member to absorb or shield radiation.

In other words, the present invention is designed to arrange a substrate for photoelectric conversion elements and/or a base stand to be a member to absorb or shield radiation.

In this respect, for the member to absorb or shield radiation, it is preferable to provide metal selected at least from a group formed by Pb, Ba, Ta, or W. It is desirable to use glass for the formation of such member to absorb or shield radiation.

Also, it is preferable to contain the aforesaid metal as an oxide in such member.

In addition, the semiconductor circuit may include ICs.

Also, it may be possible to provide a frame that houses the sensor array, base stand, and semiconductor circuit. Here, it is preferable to make the frame capable of transmitting radiation.

Also, to the frame, it may be possible to fix the sensor array, the semiconductor circuit, and the base stand that may be arranged as required.

Also, it is preferable to arrange the sensor array, (particularly, in order of the photoelectric conversion elements and substrate), the base stand that may be arranged as required, and the semiconductor circuit in that order from the side where radiation is irradiated.

Further, it is desirable to provide a wavelength converter such as phosphor. With the structure thus arranged, it is possible to obtain a good sensitivity even by the application of weak radiation.

DETAILED DESCRIPTION OF THE PREFERRED EMBODIMENTS

Hereinafter, the present invention will be described with reference to the accompanying drawings as required.

Figure 1:
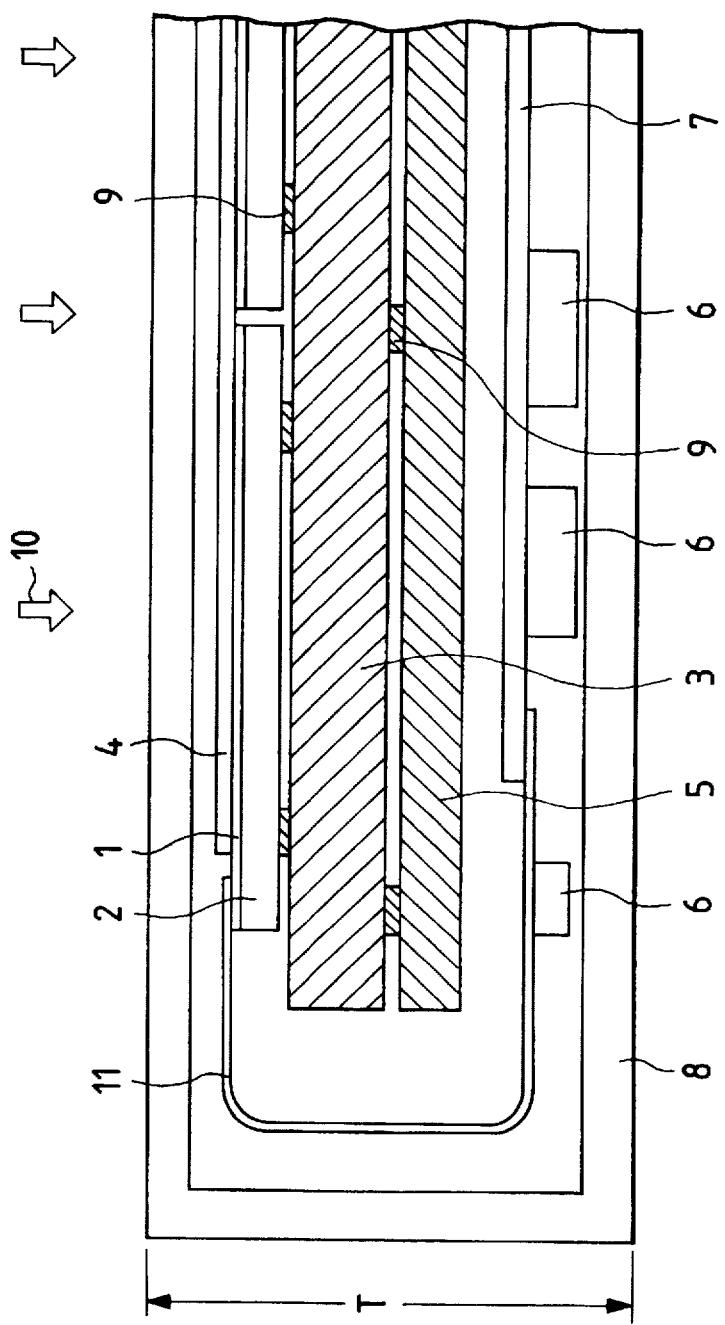
FIGS. 1, 2, 3, 8, and 10 are cross-sectional views which schematically illustrate one example of imaging apparatus, respectively.

FIG. 1 is a cross-sectional view schematically showing one example of preferable photoelectric conversion unit incorporated in the imaging apparatus that detects radiation as described above.

In FIG. 1, a reference numeral 1 designates a photoelectric conversion element; 2, a photoelectric conversion element substrate that is a base body to form the photoelectric conversion element; 3, a base stand that positions and fixes the substrate 2 as required in consideration of its positional relationship with the photoelectric conversion element; 4, the phosphor that converts the wavelength of radiation to that of visible light; 5, a shielding material, such as lead, to absorb radiation or block the transmission of radiation; 6, ICs to drive, transfer, and process the signals obtained from the photoelectric conversion elements; 7, a base board of electric circuit to hold ICs and transmit signals; 8, a radiation transmitting frame that houses each of the components, and serves as the outer frame of the photoelectric conversion elements; 9, adhesive agent to bond the substrate 2 and base stand 3 or the base stand 3 and the shielding material 5; 10, radiation; and 11, a flexible wiring. Here, a reference mark T designates the thickness of the photo-electric conversion unit.

As shown in FIG. 1, a singular number or a plurality of photoelectric conversion elements are fixed to the base stand 3 formed by metal, glass, or the like in order to obtain mechanical strength. Also, on the reverse side of the base stand 3, a lead plate 5 to absorb radiation is adhesively bonded as a shielding member to protect the external scattering of radiation, and to prevent ICs from being damaged as well.

Figure 2:
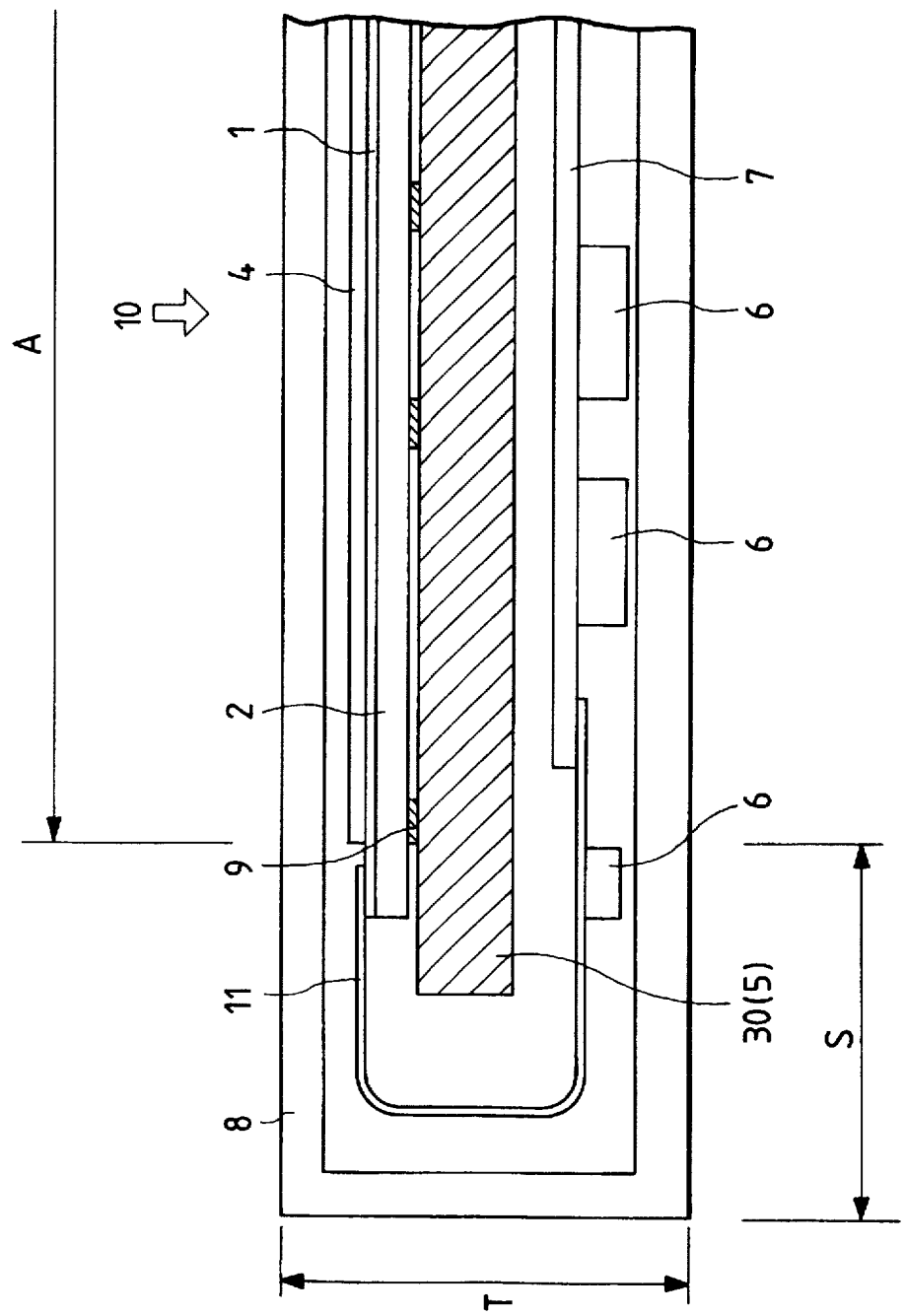

FIG. 2 shows one example in which the photoelectric conversion element substrate 2 is singular, and the shielding member (5) dually serves as a base stand 30.

In this respect, a reference mark A in FIG. 2 designates a photosensitive area, and S, a non-photosensitive area.

As shown in FIG. 1 and FIG. 2, the provision of the shielding member 5 for the photoelectric conversion element substrate 2 makes it possible to absorb or shield radiation, such as X-rays, that transmits the photoelectric conversion element substrate 2 or the circumference thereof. As a result, it is possible to solve the problem, among some others, that radiation is irradiated upon the integrated circuits (ICs) arranged to drive the array or matrix of the photoelectric conversion elements 1.

Nevertheless, in practice, even with the provision of a shielding member 5 such as described above, some more problems may be encountered unexpectedly.

In other words, the adhesive bonding between the base stand and the lead plate requires a difficult technique. As a result, a problem tends to occur that the adhesion is caused to peel off, because the linear expansion coefficients of the base stand and the lead plate are different, thus resulting in the different amounts of expansions thereof due to environmental changes deriving from the changes of temperature. In particular, the larger the area of the substrate, the more is the amount of deviation increased. Also, from the viewpoint of the problems related to the positioning accuracy of photoelectric conversion elements, this adhesive bonding needs a highly disciplined skill in executing this technique.

Particularly when imaging is operated in an environment that creates thermal shocks, and also, high temperature and humidity, the base plate of sensor glass is caused to peel off from the lead plate and fall off due to difference in the thermal expansion factors between the glass base plate and the lead plate. As a result, the flexible wiring is liable to be damaged, and further, the ICs being irradiated by radiation are caused to bring about malfunctions and other problems.

Of course, it is conceivable that a lead plate is mechanically coupled with a glass base board, but in this case, the thickness T of the frame and the width S of edges should inevitably be made larger. Further, a complicated design and assembling are needed to implement such mechanical coupling.

Here, the lead plate is not completely a hard body. Therefore, the sheet type plate, which is usually adopted, is extremely difficult to handle. Particular attention should be given when carrying on its assembling, leading to the additional numbers of processing steps.

Moreover, if the lead plate is replaced by a metallic material that absorbs or shields radiation (that is, a material easy to handle, but having the same linear expansion coefficient as that of the base stand), it is required to make its thickness several times more than that of the lead plate in order to absorb the same quantity of radiation as lead plate, simply because, although radiation can be absorbed by use of such metallic material, the ratio of its absorption is lower than the lead plate. Eventually, therefore, there is still a problem that the photoelectric conversion unit should become larger and heavier.

In this respect, the present inventor et al have ardently studied every aspect with a view to eliminating the difficult technique required to adhesively bond the base stand and lead plate, while discontinuing the use of any specially prepared lead plate, thus making it possible to improve reliability, at the same time, to reduce the number of parts, and processing steps as well, for the materialization of the cost down and the provision of a smaller apparatus.

After such researches and developments, it is found that the outstanding problems can be solved by the provision of a radiation imaging apparatus for which the photoelectric conversion element substrate having photoelectric conversion elements arranged thereon and/or the base stand having the photoelectric conversion element substrate fixed thereto is formed by a substance that can absorb or shield radiation, such as lead glass as the material of such substrate or stand.

Here, in accordance with the present invention, it is possible to eliminate the lead plate that has been required conventionally, and the bonding process thereof as well by arranging to replace the material of the photoelectric conversion element substrate having photoelectric conversion elements formed thereon and/or the base stand having the photoelectric conversion element substrate fixed thereto with a substance that can absorb or shield radiation, such as lead glass. In this way, it is possible to reduce the costs, the weight as well as the size of the apparatus, while attaining the enhancement of its reliability.

Figure 3:
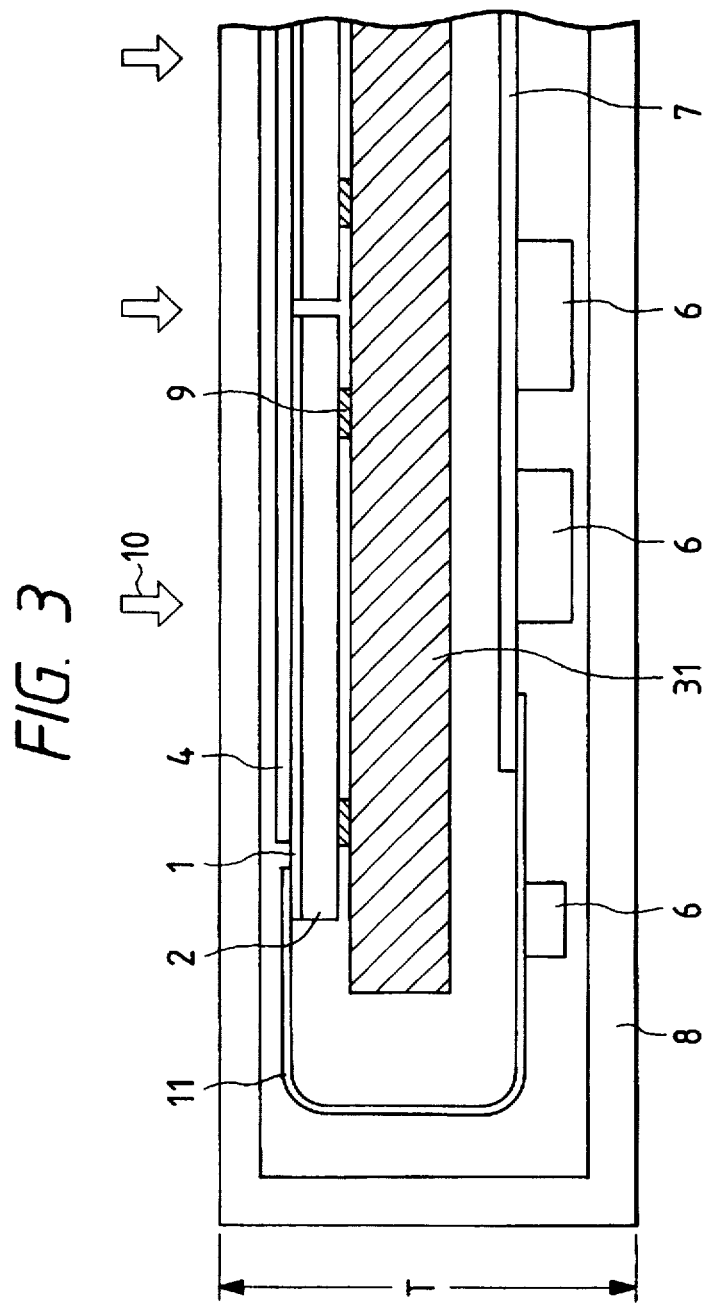

FIG. 3 is a cross-sectional view schematically illustrating one preferable example of an imaging apparatus in accordance with the present invention.

In FIG. 3, the same reference numerals and marks as those appearing in FIG. 1 and FIG. 2 designate the same parts and positions. Here, a reference numeral 31 designates a base stand, which is a glass containing metal that shields radiation. As a metal that can effectively absorb or shield radiation, Pb, Ba, Ta, or W can be cited specifically. Usually, any one of these metallic materials can be contained in glass as an oxide. Also, there is no problem if at least one or more kinds thereof are contained in glass.

With the structure described above, it is possible to eliminate the adhesive bonding between the substrate and lead plate, and between the metal plate and base stand, hence solving the problems related to the transmission and scattering of radiation, and implementing a highly reliable, lighter and thinner imaging apparatus at lower costs.

In accordance with the present invention, any one of the materials given below can be named as one preferable example of glass containing metal that can absorb or shield radiation.

Here, any one of such glasses exemplified is of course usable for the photoelectric conversion element substrate and/or the base stand.

1) $SiO_2$ 51.2 wt %, $Na_2O$ 15.8 wt %, $K_2O$ 1.2 wt %, PbO 30.0 wt %

2) $SiO_2$ 42.5 wt %, $Na_2O$ 8.0 wt %, $K_2O$ 5.5 wt %, PbO 41.5 to 43.5 wt %

3) $SiO_2$ 27.1 wt %, $K_2O$ 2 wt %, PbO 71 wt %

4) $SiO_2$ 29 wt %, PbO 62 wt %, BaO 8.1 wt %, CeO 0.9 wt %

5) $SiO_2$ 2 wt %, PbO 82 wt %, $Ta_2O_5$ 2 wt %, $B_2O_3$ 14 wt %

6) PbO 60.0 wt %, $WO_3$ 21.3 wt %, $P_2O_5$ 16.1 wt %, $TiO_2$ 1.0 wt %

The absorbing or shielding indices of these materials against radiation are fundamentally dependent on the content of metal that can absorb or shield radiation. Therefore, it is possible to decide on the content requirement appropriately as desired in accordance with the characteristics to be obtained.

Also, for example, the heat resistance of lead glass is generally lowered as the content of Pb is increased. Therefore, if lead glass should be used as a photoelectric conversion element substrate, there is a need for a sufficient attention that should be given not only to the absorbing or shielding effect against radiation, but also, to the temperature at which it should arrive during its manufacturing processes. For example, if amorphous silicon is used for the photoelectric conversion elements, it is necessary for its substrate to be provided with heat resistance of up to approximately 350° C. or at least up to 200° C. in order to produce a high quality amorphous silicon film. With this requirement in view, it is desirable to suppress PbO (lead oxide) to 82 wt % or less, preferably to 60 wt % or less.

The composition described above is of course modified appropriately in accordance with the strength and flatness required, among other factors.

Now, the description will be made of one preferable example of photoelectric conversion elements usable for the present invention.

Figure 4:
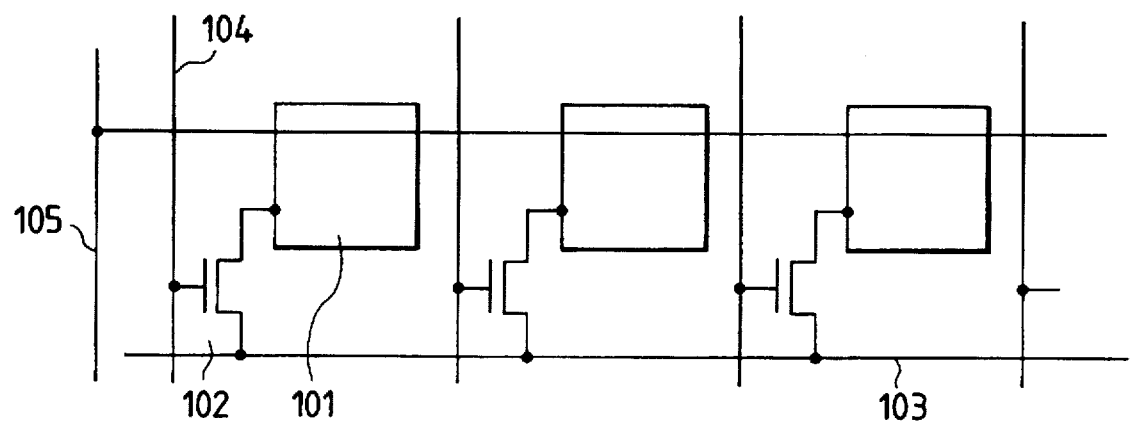
FIG. 4 is a diagram schematically showing the structure of a circuit, which illustrates one example of array of photoelectric conversion elements applicable the present invention.
Figure 5:
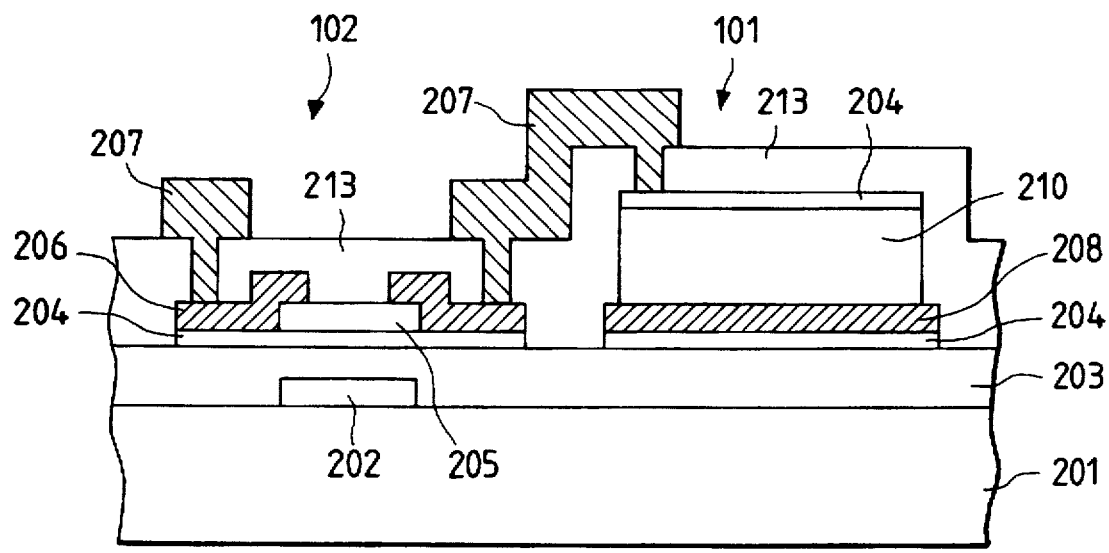
FIG. 5 is a cross-sectional view schematically showing one pixel portion of one example of sensor array applicable to the present invention.

FIG. 4 and FIG. 5 illustrate an example in which PIN type photoelectric conversion elements and switching TFTs are arranged per pixel. FIG. 4 is a diagram which schematically shows the structure of circuit. FIG. 5 is a cross-sectional view which schematically shows the example.

In FIG. 4 and FIG. 5, a reference numeral 101 designates a photoelectric conversion element; 102, a switching TFT; 103, a data line; 104, a gate line; 105, a bias line; 201, a glass substrate; 202 a gate electrode formed by Cr or the like; 203, a gate insulating film formed by inorganic material represented by SiN (silicon nitride) or the like; 204, a semiconductor film formed by i type a-Si; 205, a channel protection film formed by inorganic material represented by SiN; 206, an ohmic contact film formed by n+ type a-Si; 207, an Al electrode; 210, a semiconductor layer containing p type, i type, n type a-Si film in the layer, for example; 208, an electrode formed by Cr or the like; 209, a transparent electrode formed by ITO or the like; and 213, a protective film formed by SiN or the like.

In accordance with the example shown in FIG. 4, each of the pixels is structured by a sensor unit and switching TFT unit. Here, the optical sensor is connected to the switching TFT, and the switching TFT is connected to the data line.

The photoelectric conversion element 101 is provided with the semiconductor layer 210 and transparent electrode 209 in that order on the electrode 208 arranged on the insulating film 203 formed on the substrate 201 through the i type a-Si film 204. On the element 101, the protective film 213 is formed, and through the contact hole of the protective film 213, the electrode 207 is connected to it. The electrode 208 is electrically connected to the bias line. In this respect, it may be possible to arrange an ohmic contact layer (not shown) as required in order to make an ohmic contact between the semiconductor layer 210 and the electrode 208 or the transparent electrode 209.

The switching TFT 102 is provided with the gate electrode 202 on the substrate 201 thereof. The semiconductor film 204 is formed through the insulating film 203, which is arranged as a gate insulating film. On the semiconductor film 204, the (Al) electrode 207 serving as its source and drain, which is formed through the ohmic contact film 206. On the surface of the semiconductor film 204 that faces the channel portion, the channel protection film 205 is arranged. Further, the protective film 213 is formed.

Here, the photoelectric conversion element and the switching TFT are not limited to the structure shown in FIG. 4 and FIG. 5 as a matter of course. Also, the switching TFT is not necessarily needed. The structure of the circuit can be modified appropriately.

(Embodiment 1)

As a first embodiment, the description will be made of a method for manufacturing an imaging apparatus using lead glass for a photoelectric conversion element substrate. The composition of lead glass is: $SiO_2$, 55.3 wt %; $K_2O$, 11.1 wt %; PbO, 31.7 wt %. The thickness is 7 mm.

Also, the photoelectric conversion element and switching TFT film are formed in the same configuration in accordance with the present embodiment. Therefore, the structure is arranged so as to produce them by simple process at low costs as given below.

On a substrate 320, there are arranged an MIS type photoelectric conversion element provided with a first electrode layer 323, an insulating layer 324, a photoelectric conversion semiconductor layer 325, a carrier injection blocking layer 326, and a second electrode layer 328; and a switching TFT provided with a first electrode layer 322, an insulating layer 324, a semiconductor layer 325, an ohmic contact layer 326 for the semiconductor layer 325, and a second electrode layer 329. These components are similarly arranged, thus a simplified method of manufacture being made applicable thereto.

First of all, a method for producing a sensor array will be described.

Figure 6A:
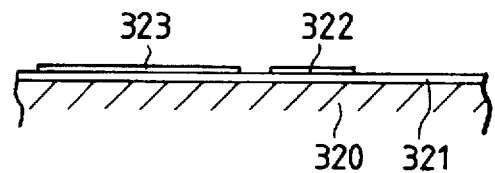
FIG. 6A to FIG. 6G are cross-sectional views schematically illustrating the processing steps, respectively, in manufacturing one example of sensor array applicable to the present invention.

At first, on the lead glass 320, an $SiO_2$ basic protection film of 1,000 Å is formed, which serves as the protection film 321 is formed by sputtering. Then, a Cr film of 1,000 Å is formed also by sputtering, and by wet etching, a patterning is executed to form the gate electrode 322 of the switching TFT and the lower electrode 323 of the photosensor accordingly (FIG. 6A).

Figure 6B:
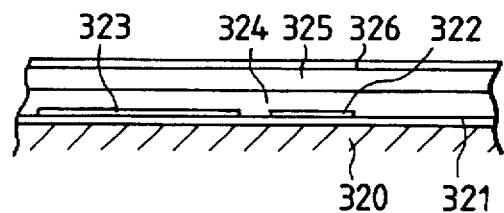

After that, by the application of plasma CVD method, there are formed continuously, an SiN film of 3,000 Å as the insulating film 324; the i type semiconductor film 325 of 5,000 Å as a photoelectric conversion layer and a semiconductor layer; and the $n^+$ type semiconductor film 326 of 1,000 Å as a carrier injection layer for the photoelectric conversion element, and an ohmic contact layer for the switching TFT (FIG. 6B).

Figure 6C:
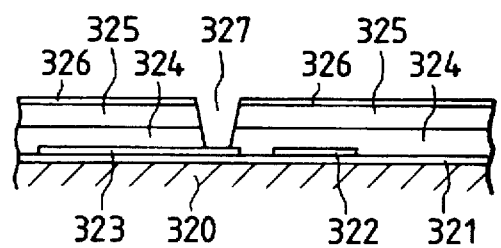

In continuation, by CDE (Chemical Dry Etching) a contact hole 327 is formed (FIG. 6C).

Figure 6D:
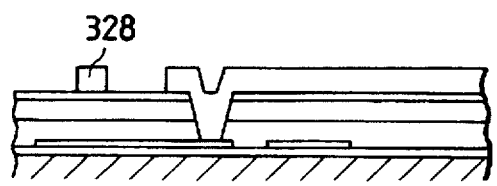

Then, an Al film of 1 μm is formed by sputtering. After that, by wet etching, the upper electrode 328 is formed for the photoelectric conversion element (FIG. 6D).

Figure 6E:
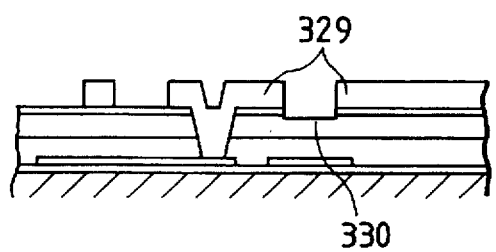

Further, by wet etching, the source and drain electrode 329 is formed for the switching TFT. After that, the $n^+$ type semiconductor film of 1,000 Å and i type semiconductor film of approximately 200 Å are processed in continuation by RIE (Reactive Ion Etching) to form the gap 330 of the switching TFT (FIG. 6E).

Figure 6F:
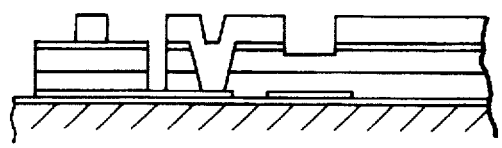

Continuously, RIE etching is given to the $n^+$ type semiconductor film 326, the i type semiconductor film 325, and the insulating film 324 to provide a partition for the element (FIG. 6F).

Figure 6G:
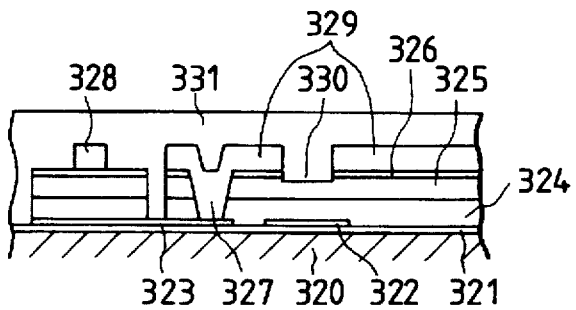

Further, an SiN film is formed by plasma CVD method as the passivation film 331, and then, the wire drawing portion and others are removed as required (FIG. 6G).

Figure 7:
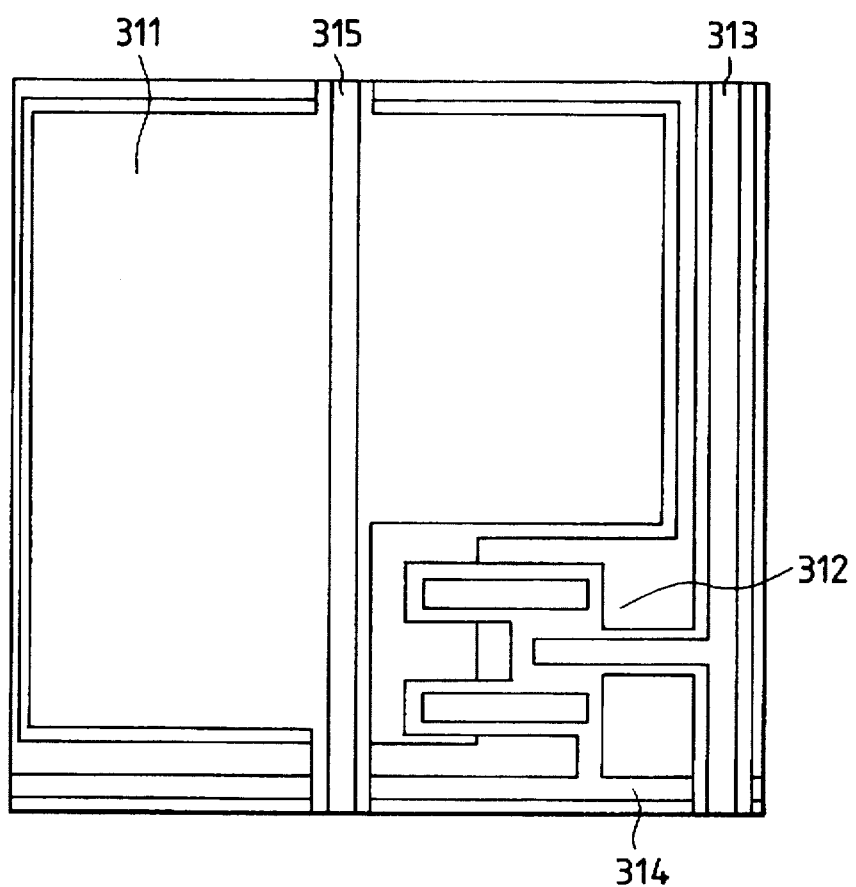
FIG. 7 is a plan view schematically illustrating one pixel portion of one example of sensor array.

FIG. 7 is a plan view which schematically shows one pixel of the photoelectric conversion unit thus produced, in which a reference numeral 311 designates an MIS type sensor unit; 312, a switching TFT unit; 314, a gate wiring; and 315, a wiring above the sensor unit.

Now, one example of the assembling method of this unit will be described.

At first, an anisotropic conductive film is temporarily connected to the sensor array having a plurality of photoelectric conversion elements, and after that, the flexible wiring is pressed to be in contact therewith, and sealed by silicone resin.

Then, the flexible wiring is soldered to a processing circuit base board.

In continuation, phosphor is adhesively bonded by use of epoxy resin on the sensor array where the base board of processing circuit is connected to the flexible wiring.

Further, the sensor array is assembled in the frame of the imaging apparatus.

Figure 8:
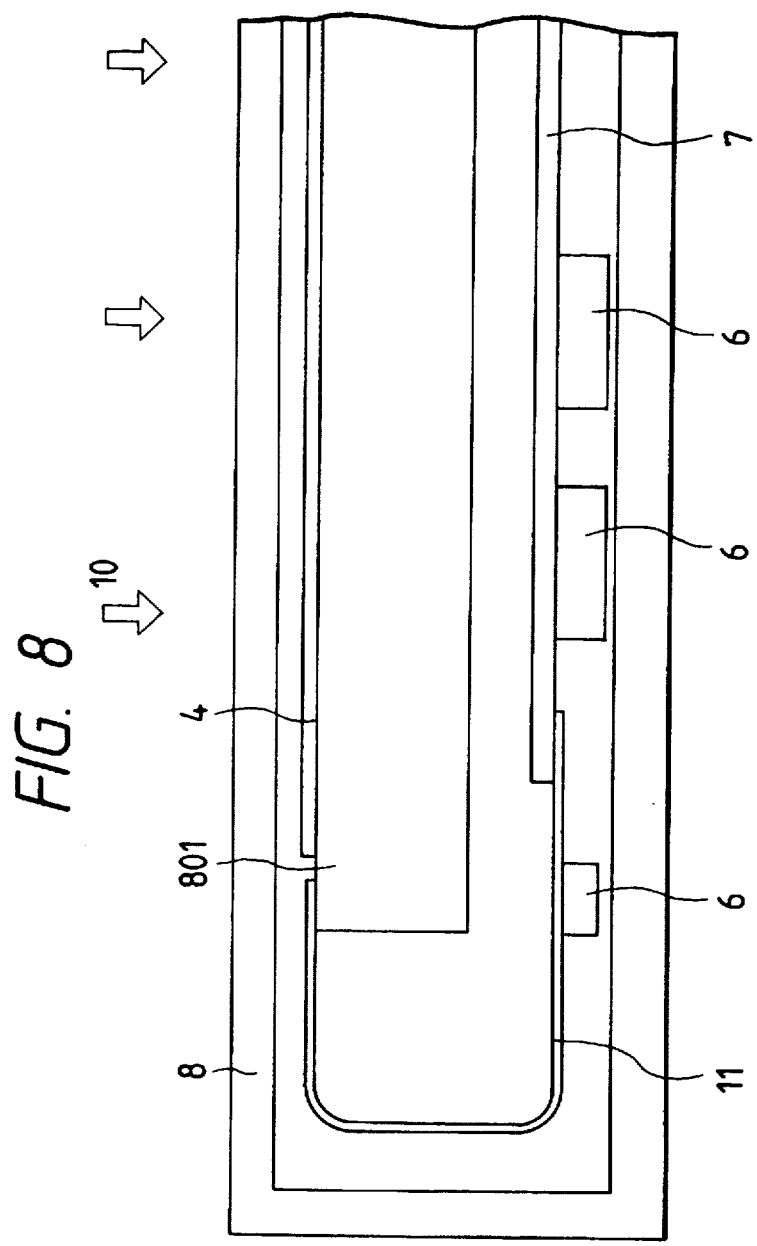

FIG. 8 is a cross-sectional view schematically showing the structure of the imaging apparatus thus manufactured. In FIG. 8, there are arranged the sensor array 801; the phosphor 4 that converts radiation to a light whose wavelength can be sensed by the photoelectric conversion elements on the sensor array; the base board 7 of processing circuit to process electric signals obtained from the sensor array; and the flexible wiring 11 that connects the base board of processing circuit and the sensor array. Each of the components is fixed to the frame 8 serving as the outer frame of the radiation imaging apparatus.

Since the photoelectric conversion element substrate is formed by lead glass for the present embodiment, the transmission of radiation is prevented or reduced, thus making it possible to protect ICs 6 on the base board of processing circuit and others. Here, radiation is incident upon in the direction indicated by an arrow designated by a reference numeral 10. With the structure described above, it is possible to materialize a light and thin radiation imaging apparatus.

(Embodiment 2)

In accordance with a second embodiment, the description will be made of a radiation imaging apparatus having a large area formed by connecting a plurality of sensor arrays described in the first embodiment.

Figure 9:
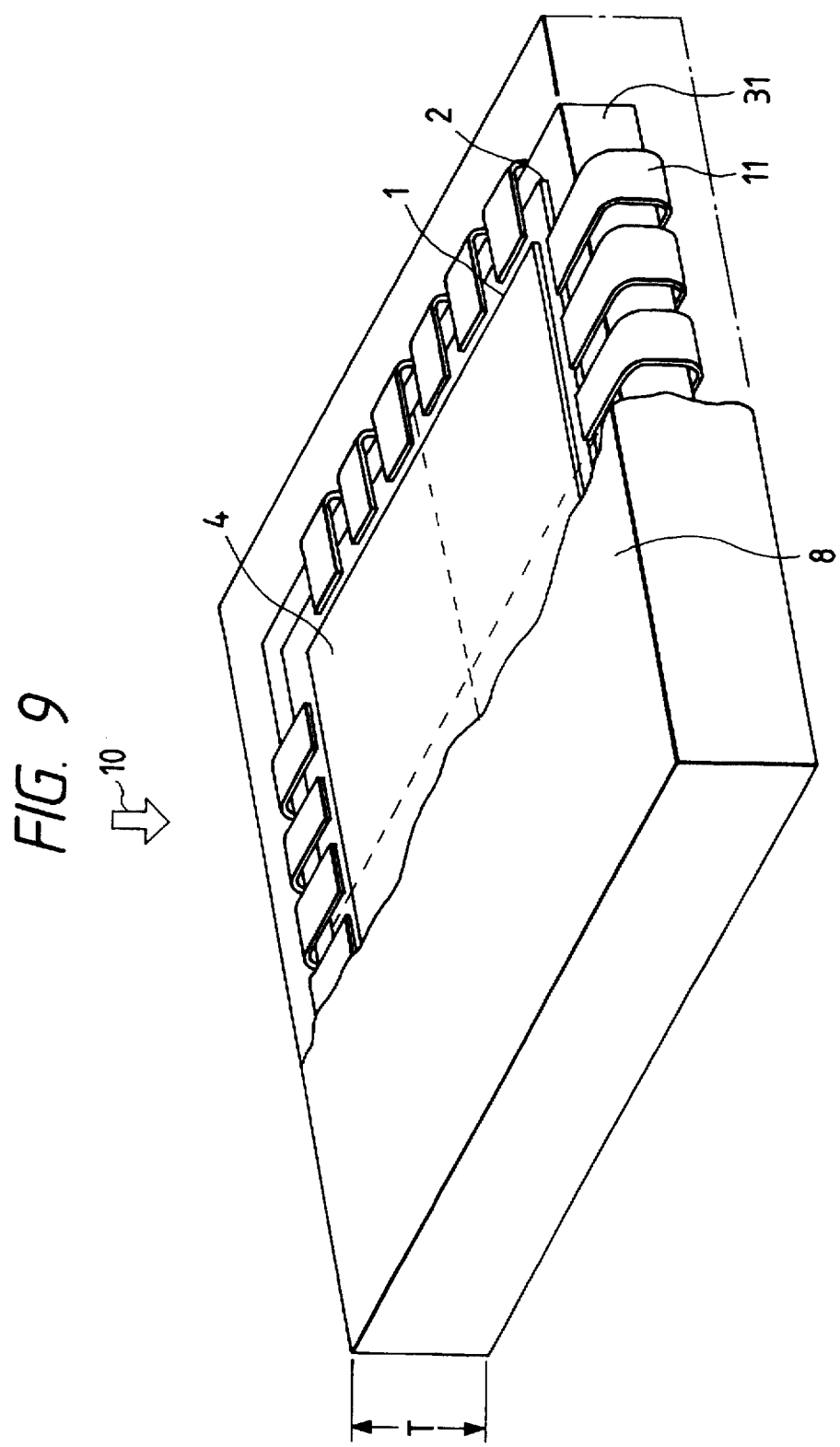
FIG. 9 is a perspective view which schematically shows on example of imaging apparatus.

FIG. 3 is a cross-sectional view schematically showing the structure of a radiation imaging apparatus in accordance with the present embodiment. FIG. 9 is a perspective view which schematically shows such apparatus.

For the present embodiment, a plurality of sensor substrates are simply fixed by the application of adhesive agent to a lead glass base stand 31 formed by the same material as the sensor substrate for the purpose of maintaining the mechanical strength and the capability of shielding X-rays. Therefore, it is possible to materialize an inexpensive, light, and thin radiation imaging apparatus having a large area. Also, the X-rays shielding capability depends on the total thickness of the sensor array substrate and base stand in this respect. As a result, by making the thickness of the substrate larger, the sensor array substrate can be made approximately 1 mm thick, which is equivalent to the thickness of the conventional glass substrate. Hence, an advantage is obtainable that the sensor array is easy to handle in forming it.

(Embodiment 3)

Figure 10:
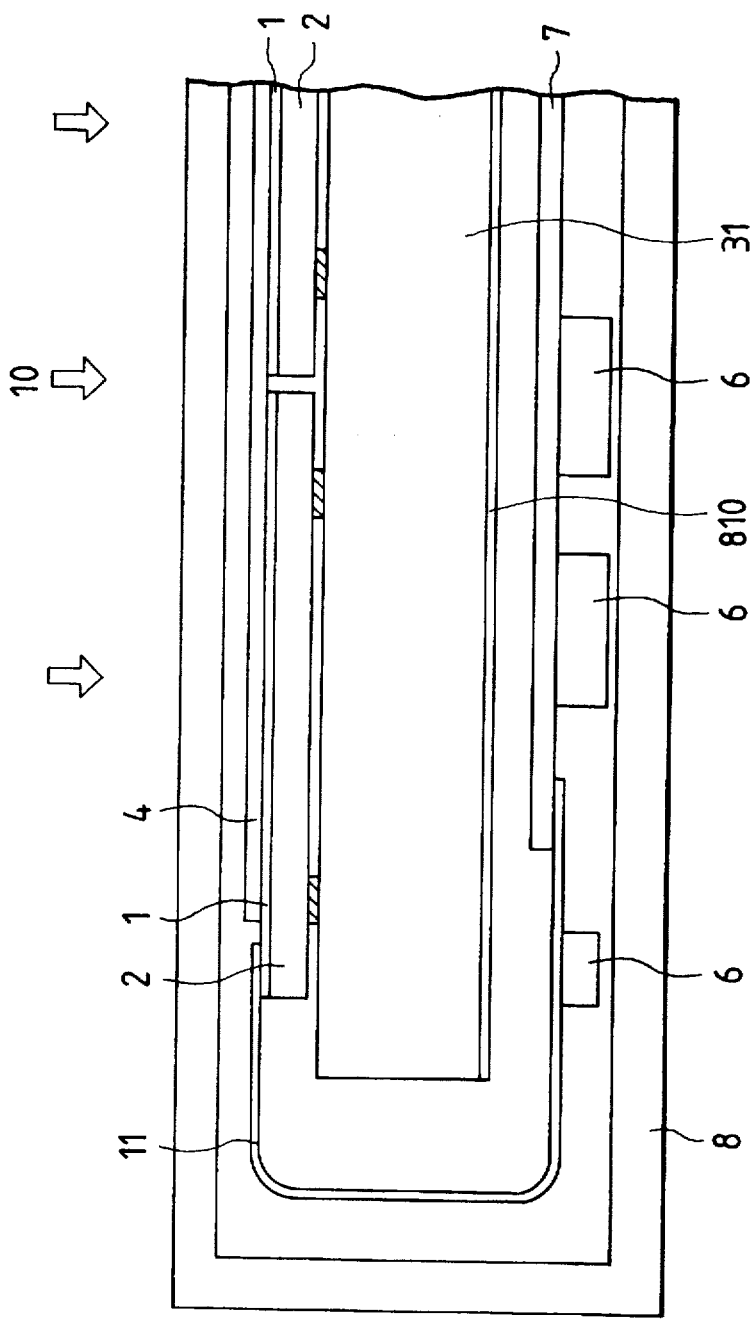

As a third embodiment, lead is provided as shown in FIG. 10 by sputtering for the base stand 31 of the second embodiment on the side opposite to the photoelectric conversion element substrate 2 side.

In accordance with the present embodiment, the thickness of lead provided by sputtering is made 200 μm. In this way, it is possible to execute the absorption or shielding of radiation more effectively.

For the second and third embodiments described above, thin lead glass of approximately 1 mm thick containing Pb of 60 wt % or less, which is used for the first embodiment, is adopted for the photoelectric conversion element substrates, respectively, and for the base stand, it may also be possible to use lead glass containing Pb of approximately 80 wt %. In this case, as compared to the thermal expansion coefficient of the substrate, the changing degrees of the thermal expansion coefficient resulting from changes in the Pb amount is within a range that can be ignored. Here, therefore, no problem is encountered at all as to any possible peeling off of the base stand that may be brought about by the difference in the thermal expansion coefficient due to difference in Pb amount.

Also, for the third embodiment, the lead sputtering may be provided further for the photoelectric conversion element substrate or may be given only to the photoelectric conversion element substrate.

In addition, not only the sputtering is applicable to the lead glass, but also to the glass that contains or not contains any metal that can shield radiation such as lead.

Here, a metal to be used for sputtering may be determined appropriately as required, but it is preferable to make the thickness 500 μm of the sputtered metal or less or it is more preferable to make it 200 μm or less with a view to keeping the sputtered metal in condition that it can hardly be peeled off.

As described above, in accordance with the present invention, it is possible to prevent the external scattering of radiation and to protect ICs, and further, even if no lead plate is provided any longer, it is possible to perform the prevention of the external scattering of radiation, the IC protection, and other functions in the same manner as before the lead plate is no longer provided for use.

Also, without using any lead plate, the number of parts can be reduced, and at the same time, the number of processing steps are curtailed. The thickness T of a photoelectric conversion unit can be made more compact, thus reducing the costs accordingly.

Moreover, any adhesive bonding is no longer needed between a base stand and a lead plate as in the conventional art, hence making it possible to enhance the reliability of the unit still more.

What is claimed is:

1. An imaging apparatus comprising:
   a substrate capable of absorbing or shielding radiation;
   a sensor array having a plurality of photoelectric conversion elements provided on said substrate to perform photoelectric conversion of radiation carrying information;
   a semiconductor circuit provided for said photoelectric conversion elements, and
   a wavelength conversion element for converting a wavelength of the radiation to a wavelength in a photosensitive area of said photoelectric conversion elements provided on an incident side of the radiation on said substrate,
   wherein said semiconductor circuit is provided on a side opposite to the incident side of said substrate.

2. An imaging apparatus according to claim 1, wherein said substrate is provided with a metal selected at least from a group formed by Pb, Ba, Ta, or W.

3. An imaging apparatus according to claim 2, wherein said substrate is glass.

4. An imaging apparatus according to claim 2, wherein said metal is contained in said substrate as an oxide.

5. An imaging apparatus according to claim 1, wherein said semiconductor circuit is provided with ICs.

6. An imaging apparatus according to claim 1, wherein a frame is provided to house said sensor array and said semiconductor circuit.

7. An imaging apparatus according to claim 6, wherein said frame transmits radiation.

8. An imaging apparatus according to claim 6, wherein said sensor array and said semiconductor circuit are fixed to said frame.

9. An imaging apparatus according to claim 1, wherein said photoelectric conversion element, said substrate, and said semiconductor circuit are arranged in that order.

10. An imaging apparatus according to claim 1, wherein a wavelength conversion element is further arranged on said photoelectric conversion element.

11. An imaging apparatus according to claim 10, wherein said wavelength conversion element is provided with phosphor.

12. An imaging apparatus according to claim 1, wherein a plurality of said sensor arrays are arranged.

13. An imaging apparatus according to claim 1, wherein said substrate is provided with a sputtered film.

14. An imaging apparatus according to claim 3, wherein said member is further provided with a sputtered film.

15. An imaging apparatus according to claim 1, wherein said sensor array is arranged on a base stand.

16. An imaging apparatus according to claim 15, wherein said base stand is provided with a member to absorb or shield radiation.

17. An imaging apparatus according to claim 16, wherein said member is metal selected at least from a group formed by Pb, Ba, Ta, or W.

18. An imaging apparatus according to claim 17, wherein said member is glass.

19. An imaging apparatus according to claim 17, wherein said metal is contained in said member as an oxide.

20. An imaging apparatus according to claim 16, said member includes the sputtered film of said selected metal.

21. An imaging apparatus according to claim 1, wherein said radiation includes X-rays or γ-rays.

22. An imaging apparatus according to claim 1, wherein said substrate comprises a base member and a member for absorbing or shielding the radiation disposed on the base member.

23. An imaging apparatus according to claim 1, wherein said wavelength conversion element includes a luminescence member.

24. An imaging apparatus according to claim 15, further comprising a plurality of said substrates provided on said base stand.

25. An imaging apparatus comprising:
    a substrate;
    a sensor array having a plurality of photoelectric conversion elements provided on said substrate;
    a base stand capable of absorbing or shielding radiation for providing said sensor array thereon; and
    a semiconductor circuit provided for said photoelectric conversion elements,
    wherein said semiconductor circuit is provided on a side opposite to an incident side of said base stand.

26. An imaging apparatus according to claim 25, wherein said base stand is provided with a metal selected at least from a group formed by Pb, Ba, Ta, or W.

27. An imaging apparatus according to claim 26, wherein said base stand is glass.

28. An imaging apparatus according to claim 26, wherein said metal is contained in said member as an oxide.

29. An imaging apparatus according to claim 25, wherein said semiconductor circuit is provided with ICs.

30. An imaging apparatus according to claim 25, wherein a frame is provided to house said sensor array, said base stand, and said semiconductor circuit.

31. An imaging apparatus according to claim 30, wherein said frame transmits radiation.

32. An imaging apparatus according to claim 30, wherein said sensor array, said base stand, and said semiconductor circuit are fixed to said frame.

33. An imaging apparatus according to claim 25, wherein said sensor array, said base stand, and said semiconductor circuit are arranged in that order.

34. An imaging apparatus according to claim 25, wherein a wavelength conversion element is provided on said photoelectric conversion element.

35. An imaging apparatus according to claim 34, wherein said wavelength conversion element is provided with phosphor.

36. An imaging apparatus according to claim 25, wherein a plurality of said sensor arrays are arranged.

37. An imaging apparatus according to claim 25, wherein said sensor array is a sputtered film.

38. An imaging apparatus according to claim 25, wherein said member is further provided with a sputtered film.

39. An imaging apparatus according to claim 25, wherein said radiation includes X-rays or γ-rays.

40. An imaging apparatus according to claim 25, wherein said base stand comprises a base member and a member for absorbing or shielding the radiation disposed on the base member.

41. An imaging apparatus according to claim 25, further comprising a plurality of said substrates provided on said base stand.

* * * * *

UNITED STATES PATENT AND TRADEMARK OFFICE
CERTIFICATE OF CORRECTION

PATENT NO. : 5,777,335

DATED : July 7, 1998

INVENTOR(S): CHIORI MOCHIZUKI ET AL.

It is certified that error appears in the above-identified patent and that said Letters Patent is hereby corrected as shown below:

COLUMN 2

Line 67, "applicable" should read --applicable to--.

COLUMN 3

Line 11, "on" should read --one--.

COLUMN 8

Line 58, "not contains" should read --does not contain--.

Signed and Sealed this

Sixth Day of April, 1999

Attest:

Q. TODD DICKINSON

*Attesting Officer*  *Acting Commissioner of Patents and Trademarks*